(12) United States Patent
Takehara et al.

(10) Patent No.: US 6,598,699 B2
(45) Date of Patent: Jul. 29, 2003

(54) ELECTRIC POWER STEERING SYSTEM FOR VEHICLE

(75) Inventors: Shin Takehara, Hiroshima (JP); Kiyoshi Sakamoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/903,677

(22) Filed: Jul. 13, 2001

(65) Prior Publication Data

US 2002/0005314 A1 Jan. 17, 2002

(30) Foreign Application Priority Data

Jul. 13, 2000 (JP) .................................... 2000-212471
Mar. 6, 2001 (JP) .................................... 2001-062389

(51) Int. Cl.$^7$ ........................................... B62D 5/04
(52) U.S. Cl. ................................... 180/446; 180/443
(58) Field of Search ........................ 180/443, 446; 701/41, 42, 43; 318/432

(56) References Cited

U.S. PATENT DOCUMENTS

| | | | | |
|---|---|---|---|---|
| 4,685,528 A | * | 8/1987 | Suzuki et al. ........... | 180/79.1 |
| 5,631,529 A | * | 5/1997 | Shimizu et al. .......... | 318/432 |
| 5,978,721 A | * | 11/1999 | Kagawa et al. .......... | 701/41 |
| 6,134,490 A | * | 10/2000 | Ito et al. ................. | 701/42 |
| 6,227,328 B1 | * | 5/2001 | Shimizu .................. | 180/422 |

OTHER PUBLICATIONS

Patent Abstract of Japan, Publication No. 08–072734 Date of Publication Mar. 19, 1996, Inventor, Eiki Matsunaga et al.

* cited by examiner

*Primary Examiner*—Lesley D. Morris
*Assistant Examiner*—Tony Winner
(74) *Attorney, Agent, or Firm*—Nixon Peabody LLP; Donald R. Studebaker (57) ABSTRACT

An electric power steering system determines an assist control quantity for assist control by multiplying a turning torque applied to a steering wheel by a control gain, a damping control quantity for damping control by multiplying a rotational speed of motor by a control gain and a feedback control quantity for steering angle feedback control from a deviation between a target rotational speed of motor determined on the basis of the turning torque and an actual rotational speed of motor, and controls an electric motor with a motor control quantity that is determined on the basis of the assist control quantity, the damping control quantity and the feedback control quantity.

16 Claims, 8 Drawing Sheets

*PRIOR ART*

ELECTRIC POWER STEERING SYSTEM FOR VEHICLE

BACKGROUND OF THE INVENTION

1. Field of the Invention

The present invention relates to an electric power steering system for vehicles and, more particularly, to a motor-controlled power steering system for assisting operation of a steering wheel through controlling an electric motor.

2. Description of Related Art

There have been known motor controlled power steering systems and hydraulically controlled power steering systems. Such a power control system actualizes a desired assist characteristic by regulating a controlling quantity for the electric motor or a controlling hydraulic quantity according to a turning torque applied to a steering wheel and/or a steering speed (which is a differential value of turning torque). It is known from, for example, Japanese Unexamined Patent Publication 8-72734 to change the assist characteristic according to a vehicle speed or a yaw rate in addition to a vehicle speed.

In the prior art electric power steering system a motor controlling quantity for the electric motor is determined by multiplying a turning torque applied to a steering wheel, that is detected by a torque sensor such as a torsion bar type torque sensor disposed between a steering wheel and one of front wheels, by a specified assist control gain. The assist control gain is predetermined based on tests conducted on a given vehicle so as to provide a desired assist characteristic.

However, there are possibly variations in assist characteristics of power steering systems. This causes that the feeling of steering varies with the assist characteristic of power steering system. The variation in assist characteristics is due, for example, to variations in inertia and variations in electric motor property and/or variations in friction of parts of reduction gears of steering apparatuses that are disposed between a steering shaft and an electric motor. The variation in friction is predominantly due to manufacturing errors of the parts of the steering apparatus. Specifically, when the part has a magnitude of friction greater than an ordinary magnitude of friction, thrust of the electric motor is spent for the friction even though the electric motor is controlled with a motor controlling quantity that is determined by multiplying the turning torque applied to the steering wheel by the assist control gain. As a result, the electric motor encounters a lack of assist torque for steering, so as to cause a feeling of tottery operation of the steering wheel.

The variation in assist characteristic is further due to assembling errors of, for example, the reduction gear. The reduction gear comprises a worm gear and a worm wheel that have a comparatively large reduction gear ratio. In order for the reduction gear to prevent or significantly reduce backrush and rattling noises, the worm gear is strongly forced against the worm wheel. This causes relatively large variations in friction due to assembling errors because of a high magnitude of friction between the worm gear and the worm wheel forced against each other and has a significant influence on the variations in assist characteristic.

The prior art electric power steering system has the problem of yaw overshooting of front wheels. Since the yaw overshoot cancellation property of wheels (which is referred to the action of wheels such that the front wheels smoothly restore a steering angle of 0 (zero) due to a self-aligning torque without overshooting when letting go a hold on the turned steering wheel) has repercussions on the straight ahead controllability of vehicle, the prior art electric power steering system implements the damping control for braking the electric motor with a controlling quantity of damping that is determined by multiplying a rotational speed of motor by a damping control gain in addition to the assist control. Similarly to the assist control gain, the damping control gain is regulated so that the yaw overshoot cancellation property of wheels is desirable. Therefore, there is the problem that the desired yaw overshoot cancellation property of wheels is not attained. This is due to non-restoration of the steering wheel to the center or neutral position (straight ahead traveling position) or shakes of the steering wheel at the center or neutral position due, for example, to the variations in inertia and/or friction.

In order to eliminate the aforesaid problem, it is valuable to get rid of manufacturing errors of parts of the steering apparatus or to employ high precision parts of the steering apparatus for reducing friction. However, in addition to a change in the magnitude of friction due to expansion or contraction of parts of the steering apparatus that are caused following a change in temperature or a change in magnitude of friction due to aging of parts of the steering apparatus, the assist characteristic and the yaw overshoot cancellation property of wheels possibly change due to a change in gross vehicle weight resulting from a change in loadage. In consequence, it is hard to eliminate the aforesaid problem even when employing high precision parts of the steering apparatus. The utilization of high precision parts causes additional costs of manufacturing the steering apparatus.

SUMMARY OF THE INVENTION

An object of the present invention is therefore to provide an electric power steering system for a vehicle that always provides steering apparatuses with a desired assist characteristic and a desired yaw overshoot cancellation property of wheels.

It is another object of the present invention to provide an electric power steering system which provides a steering apparatus with an improved follow-up property of wheels to operation of the steering wheel.

It is a further object of the present invention to provide an electric power steering system which is provided at low costs.

The above object of the present invention is accomplished by an electric power steering system for a vehicle which performs feedback control of a steering apparatus on the basis of a turning torque applied to a steering wheel in addition to assist control for controlling an electric motor so as to assist a turn of the steering wheel.

According to a preferred embodiment of the present invention, the electric power steering system comprises a torque sensor disposed between the steering wheel and front wheels of the vehicle and operative to detect a turning torque applied to the steering wheel, first control means for determining such a first control quantity as to countervail the turning torque when the electric motor is controlled with the first control quantity, second control means for operating a target rate of change in wheel steering angle on the basis of the turning torque and for determining a second control quantity by subtracting an actual rate of change in wheel steering angle from the target rate of change in wheel steering angle, and motor control means for determining a motor control quantity by adding the first control quantity and the second control quantity together and for controlling the electric motor with the motor control quantity.

The torque sensor detects a turning torque applied to the steering wheel when the steering wheel is turned to steer the vehicle. The first control means determines such a first control quantity as to countervail the turning torque when the electric motor is controlled with the first control quantity, in other words determines a first control quantity representative of an assist torque by multiplying a turning torque by a specified control gain. The second control means determines a target rate of change in wheel steering angle on the basis of the turning torque and then determines a second control quantity by subtracting an actual rate of change in wheel steering angle from the target rate of change in wheel steering angle. The operation of the target rate of change in wheel steering angle may be made based on a vehicle model of a mechanical system of an steering apparatus between the torque sensor and a tire on the front wheel or a vehicle model in which factors such as inertia of an electric motor and a knuckle arm and spring component and dumping component of a tire are taken into consideration. The motor control means controls the electric motor with the motor control quantity which is determined by adding the first control quantity and the second control quantity together.

When considering that the control of the electric motor with the first control quantity does not provide a desired rate of change in wheel steering angle due to friction and inertia of the steering apparatus, there is an occurrence of a deviation between an actual rate of change in wheel steering angle and the target rate of change in wheel steering angle determined on the basis of a turning torque applied to the steering wheel that is detected by the torque sensor. Therefore, the control of the electric motor with the second control quantity that is determined on the basis of the deviation causes the electric motor to generate thrust which the electric motor is short of in order to provide the target rate of change in wheel steering angle, so that the vehicle is always steered at a desired rate of change in wheel steering angle. In this instance, because the second control quantity is determined on the basis of a target rate of change in wheel steering angle that is independent from friction and inertia of the steering apparatus, the rate of change in wheel steering angle is always desirable with respect to a turn of the steering angle irrespective of variations in friction and inertia. This clears variations in assist characteristic among steering apparatuses.

That the torque sensor detects a turning torque applied to the steering wheel indicates a response delay of a change in wheel steering angle with respect to driver's turning operation of the steering wheel. However, the control of the electric motor with the second control quantity causes the electric motor to increase thrust while the torque sensor detects a turning torque applied to the steering wheel. This makes the electric motor to quickly follow up the turning operation of the steering wheel. As a result, a feeling of tottery operation of the steering wheel is eliminated and the follow-up property of wheels is improved.

Furthermore, when letting go a hold on the turned steering wheel, the torque sensor detects a turning torque of 0 (zero), this indicates that the target rate of change in wheel steering angle is determined to be 0 (zero). Accordingly, the electric motor is controlled with the second control quantity so that the front wheels attain a rate of change in wheel steering angle of 0 (zero), thereby preventing the steering wheel from tottery operation and is provided with an improved yaw overshoot cancellation property of wheels, consequently. Whenever the torque sensor detects a turning torque of 0 (zero), the target rate of change in wheel steering angle is 0 (zero). The front wheels, and hence the steering wheel, is always centered with a desire characteristic irrespective of variations in friction and inertia. This eliminates variations in the yaw overshoot cancellation property of wheels among steering apparatuses. On the other hand, in the case where the front wheels change a steering angle due to road surface irregularities, while the torque sensor detects a turning torque of 0 (zero), the front wheels are such that they are unintentionally steered at an uncertain rate of change in wheel steering angle is not 0 (zero). In this event, the second control means controls the electric motor so that the front wheels attain a rate of change in wheel steering angle of 0 (zero), thereby keeping the vehicle in a straight ahead traveling state.

This control is actualized by additionally providing the second control means in the prior art electric power steering system. This does not need extra sensors and the like, so that the steering apparatus can be the same in mechanical structure and operation as those that have been practically used. Therefore, the electric power steering system of the present invention provides desired assist characteristics and a desired yaw overshoot cancellation property of wheels and the follow-up property of wheels, the straight ahead controllability of vehicle, all of which can be realized with complex control beyond the scope of a low cost power steering system.

According to another preferred embodiment of the present invention, a wheel steering angle is used as one of parameters in place of a rate of change in wheel steering angle. Specifically, the electric power steering system comprises a torque sensor disposed between the steering wheel and front wheels of the vehicle and operative to detect a turning torque applied to the steering wheel, first control means for determining such a first control quantity as to countervail the turning torque when the electric motor is controlled with the first control quantity, second control means for operating a target wheel steering angle on the basis of the turning torque and for determining a second control quantity by subtracting an actual wheel steering angle from the target wheel steering angle; and motor control means for determining a motor control quantity by adding the first control quantity and the second control quantity together and for controlling the electric motor with the motor control quantity.

The second control means determines a target wheel steering angle and determines a second control quantity by subtracting an actual wheel steering angle from the target wheel steering angle. The operation of target wheel steering angle may be made based on a vehicle model as previously described. The motor control means controls the electric motor with the motor control quantity which is determined by adding the first control quantity and the second control quantity together.

Even when the control of the electric motor with the first control quantity does not provide a desired wheel steering angle due to friction and inertia of the steering apparatus, the control of the electric motor with the second control quantity, i.e. a deviation between of an actual wheel steering angle from the target wheel steering angle, causes the electric motor so that the front wheels attain the target wheel steering angle. In this instance, because the target wheel steering angle is independent from friction and inertia of the steering apparatus, the wheel steering angle is always desirable with respect to a turn of the steering angle irrespective of variations in friction and inertia. This clears variations in assist characteristic among steering apparatuses.

When there is an occurrence of a response delay of wheel steering angle with respect to driver's turning operation of the steering wheel, the control of the electric motor with the second control quantity causes the electric motor to increase thrust. Therefore, the electric motor is controlled so as to quickly follow up the turning operation of the steering wheel. This results in improved follow-up property of wheels.

The electric motor is controlled with the second control quantity so as to attain a wheel steering angle of 0 (zero) when the torque sensor detects a turning torque of 0 (zero). Therefore, when letting go a hold on the turned steering wheel, the electric motor is controlled so that the front wheels attain a steering angle of 0 (zero). This realizes quick centering of the front wheels, and, in consequence, the steering wheel is prevented from tottery operation and is provided with a more improved yaw overshoot cancellation property of wheels. The control of the electric motor with the second control quantity always provides a specified yaw overshoot cancellation property of wheels irrespective of magnitude of friction and inertia of the steering apparatus. This eliminates variations in the yaw overshoot cancellation property of wheels among steering apparatuses. On the other hand, in the case where the front wheels change a steering angle due to road surface irregularities, while the torque sensor detects a turning torque of 0 (zero), the front wheels are such that they are unintentionally steered at an uncertain rate of change in wheel steering angle is not 0 (zero). In this event, the second control means controls the electric motor so that the front wheels attain a rate of change in wheel steering angle of 0 (zero), thereby keeping the vehicle in a straight ahead traveling state.

This control is actualized by additionally providing the second control means in the prior art electric power steering system. Therefore, the electric power steering system of the present invention provides desired assist characteristics and desired yaw overshoot cancellation property of wheels and the follow-up property of wheels, the straight ahead controllability of vehicle, all of which can be realized with complex control beyond the scope of a low cost power steering system.

The control that is performed by the electric power steering system of the first embodiment is such as to bring the rate of change in wheel steering angle to 0 (zero) when there is no turning torque that is detected by the torque sensor, which is different from the control performed by the electric power steering system of the second embodiment in which the wheel steering angle is brought into 0 (zero) in the same event. Therefore, the electric power steering system of the first embodiment possibly causes such an action as reducing a self-aligning torque on the front wheels or the steering wheel. On the other hand, the control that is performed by the electric power steering system of the second embodiment is based on the steering displacement of front wheel (a wheel steering angle) possibly be slow in response of steering to a turn of the steering wheel as compared with the electric power steering system of the first embodiment in which the control is performed based on the steering speed of front wheel (a rate of change in wheel steering angle).

In light of the above problems, the electric power steering system according to another preferred embodiment employs a target rate of change in wheel steering angle as a second control quantity and a target wheel steering angle as a third control quantity in order to determine a motor control quantity. Specifically, the electric power steering system comprises a torque sensor disposed between the steering wheel and front wheels of the vehicle and operative to detect a turning torque applied to the steering wheel, first control means for determining such a first control quantity as to countervail the turning torque when the electric motor is controlled with the first control quantity, second control means for operating a target rate of change in wheel steering angle on the basis of the turning torque and for determining a second control quantity by subtracting an actual rate of change in wheel steering angle from the target rate of change in wheel steering angle, third control means for operating a target wheel steering angle on the basis of the turning torque and for determining a third control quantity by subtracting an actual wheel steering angle from the target wheel steering angle; and motor control means for determining a motor control quantity by adding the first control quantity, the second control quantity and the third control quantity together and for controlling the electric motor with the motor control quantity.

Because the electric power steering system has both of the second control means that determines a target rate of change in wheel steering angle on the basis of a turning torque applied to the steering wheel and determines a second control quantity by subtracting an actual rate of change in wheel steering angle from the target rate of change in wheel steering angle and the third control means that determines a target wheel steering angle on the basis of the turning torque applied to the steering wheel and determines a third control quantity by subtracting an actual wheel steering angle from the target wheel steering angle, it always provides a desired assist characteristic and a desired yaw overshoot cancellation property of wheels and enhances the follow-up property of wheels, the yaw overshoot cancellation property of wheels and the straight ahead controllability of vehicle similarly to the electric power steering systems of the first and second embodiments. Further, the electric power steering system has superior responsiveness and yaw overshoot cancellation property of wheels beyond the electric power steering systems of the first and second embodiments.

In order to eliminate the above problems, it is effective to regulate the sensitivity of second control quantity. Specifically, the sensitivity of second control quantity may be changed greater with an increase in vehicle speed, an increase in gross vehicle weight, a decrease in wheel steering angle or a decrease in rate of change in wheel steering angle. Otherwise, the sensitivity of second control quantity may be changed smaller with a decrease in road surface friction coefficient. Further, the second control means implements a high-pass filtering treatment of the second control quantity.

According to still another embodiment of the present invention, the electric power steering system comprises a torque sensor disposed between the steering wheel and front wheels of the vehicle and operative to detect a turning torque applied to the steering wheel, first control means for determining such a first control quantity as to countervail the turning torque when the electric motor is controlled with the first control quantity; second control means for operating a target rate of change in wheel steering angle on the basis of the first control quantity and for determining a second control quantity by subtracting an actual rate of change in wheel steering angle from the target rate of change in wheel steering angle; and motor control means for determining a motor control quantity by adding the first control quantity and the second control quantity and the third control quantity together and for controlling the electric motor by the motor control quantity.

The electric power steering system of this embodiment exhibits the same effects as that of the first embodiment. In addition, although it is necessary for the second control means to determines a target rate of change in wheel steering angle in consideration of a control gain by which a turning torque applied to the steering wheel is multiplied like the determination of first control quantity in the first control means, it is unnecessary to take a control gain into consideration when determining the target rate of change in wheel steering angle on the basis of the first control quantity since the first control quantity has been determined in consideration of the control gain. This makes operation in the second control means simple. In addition, this makes it unnecessary that the second control means stores data of control gains.

According to a further preferred embodiment of the present invention, the electric power steering system comprises a torque sensor disposed between the steering wheel and front wheels of the vehicle and operative to detect a turning torque applied to the steering wheel, first control means for determining such a first control quantity as to countervail the turning torque when the electric motor is controlled with the first control quantity, second control means for operating a target wheel steering angle on the basis of the first control quantity and for determining a second control quantity by subtracting an actual wheel steering angle from the target wheel steering angle, and motor control means for determining a motor control quantity by adding the first control quantity and the second control quantity together and for controlling the electric motor with the motor control quantity.

In addition to the effect attained by the electric power steering system of the second embodiment, the electric power steering system of this embodiment that is structured such as to determine a target wheel steering angle on the basis of the first control quantity can be simple in operation in the second control means like the electric power steering system of the third embodiment and avoids the necessity of using a control gain in the second control means.

In the third and fourth embodiments, it is effective to structure the electric power steering system such that the first control means makes a correction of the first control quantity on the basis of a vehicle speed and a rate of change in wheel steering angle and the second control means makes a correction of the second control quantity on the basis of a vehicle speed. In the case of making a correction of the first control quantity on the basis of a vehicle speed and a rate of change in wheel steering angle and a correction of the second control quantity on the basis of a vehicle speed, if implementing parallel determination of the first and second control quantities, there occurs apprehensions of weakening the correlation between the first and second control quantities. This leads to aggravation of the follow-up property of wheels and the yaw overshoot cancellation property of wheels and causes a deterioration of steering feeling. However, according to the electric power steering system in which the second control means determines a target rate of change in wheel steering angle or a target wheel steering angle on the basis of a second control quantity determined in the second control means enhances the correlation between the first and second control quantities. This is true for the case where the first control means makes a correction of the first control quantity on the basis of a vehicle speed and a rate of change in wheel steering angle and the second control means makes a correction of the second control quantity on the basis of a vehicle speed. This prevents or significantly reduces aggravation of the follow-up property of wheels and the yaw overshoot cancellation property of wheels and improves a steering feeling.

As described above, the electric power steering system of the present invention controls the electric motor with a second control quantity determined on the basis of a rate of change in wheel steering angle or a wheel steering angle that is independent from variations in friction and inertia, so that the steering apparatus is always operated with a desired assist characteristic and a desired yaw overshoot cancellation property of wheels irrespective of magnitude of friction and inertia. This clears variations in performance among steering apparatuses. The control of the electric motor with a second control quantity improves the follow-up property of wheels to turning operation of the steering wheel. In addition, when the torque sensor detects a turning torque of 0 (zero), the control of the electric motor endeavors to make the target rate of change in wheel steering angle or the wheel steering angle 0 (zero), as a result of which, there is provided improvement in the yaw overshoot cancellation property of wheels and the straight ahead controllability of vehicle. Regulating the sensitivity of second control quantity according to a change in vehicle speed, gross vehicle weight, wheel steering angle or wheel steering angle realizes more desirable assist characteristics and yaw overshoot cancellation property of wheels. In addition, the determination of second control quantity on the basis of the target rate of change in wheel steering angle or the wheel steering angle that is determined on the basis of a first control quantity makes the second control means simple in operation and enhances the correlation between the first and second control quantities. As a result, a steering feeling is significantly improved.

BRIEF DESCRIPTION OF DRAWINGS

The foregoing and other objects and features of the present invention will become more apparent from the following description in connection with the preferred embodiments thereof when considering in conjunction with the accompanying drawings, in which the same reference numerals have been used to denote same or similar parts throughout the accompanying drawings, and wherein.

DETAILED DESCRIPTION OF THE INVENTION

In the following description, parts which are not of direct importance to the invention and parts which are purely of conventional construction will not be described in detail. For example, details of the linkage train, the internal mechanism of the steering gearbox, etc., which are necessary to the steering system, will not be set out in detail since their construction and operation can easily be arrived by those skilled in the art.

Figure 1:
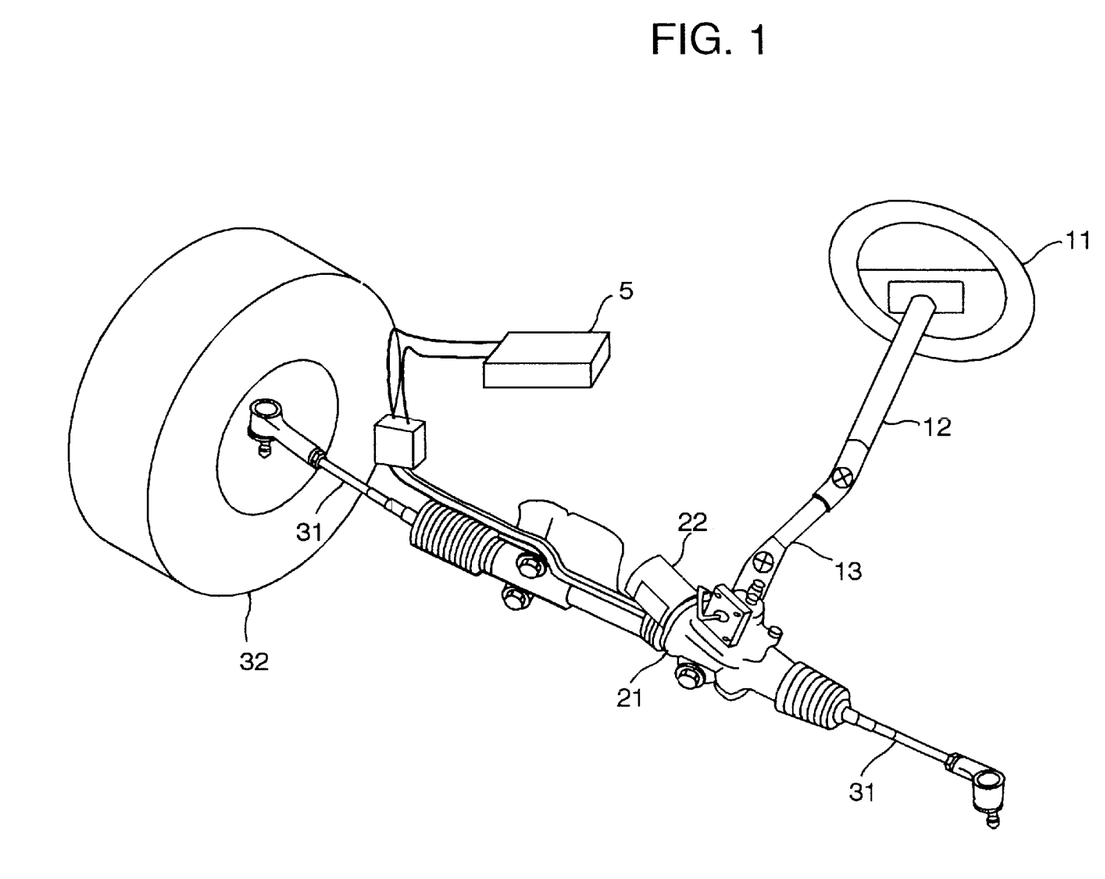
FIG. 1 is a perspective view of an electric power steering system of the present invention.

Referring to the drawings in detail, and in particular to FIG. 1 showing an electric power steering system for a vehicle, an steering apparatus 100 includes a steering wheel 11 connected to a steering gearbox 21 through a steering shaft that comprises an upper steering shaft 12 and a lower steering shaft 13, connected to the upper steering shaft 12 through a universal joint (not shown). Tie rods 31 extend from the steering gearbox 21 at opposite sides and connect front wheels 32 (only one shown) to the steering gearbox 21. The steering gearbox 21 has a rack-and-pinion mechanism (not shown). The lower steering shaft 13 is connected to the pinion through a flexible coupling (not shown) The tie rods 31 are connected to opposite ends of the rack. 21 As the steering wheel 11 is turned, the steering shafts 12 and 13 turn to transmit the driver's turning torque to the steering gearbox 21 where the driver's turning torque is multiplied so the front wheels may be turned easily.

The steering gearbox 21 is provided with an electric motor 22 and a torque sensor 41 (see FIGS. 2 and 4 to 7). The electric motor 22 supplies torque assist to the steering apparatus 100 through a reduction gear set (not shown), providing torque assist to the vehicle steering. The torque sensor 41 is located between the lower steering shaft 13 and the reduction gear set. As the steering wheel 11 is turned, the torque sensor 41 senses the torque applied to the steering wheel 11 by the operator. A controller, that is generally designated by a reference numeral 5 in FIG. 1, receives signals representative of control parameters such as a signal of vehicle speed V from a vehicle speed sensor 42 (see FIGS. 2 and 4 to 7) and a signal of rotational speed of motor ω of the electric motor 22 from a motor speed sensor 43 (see FIGS. 2 and 4 to 7) in addition to a signal of driver's turning torque u from the torque sensor 41. The torque sensor and motor speed sensors are known in various forms and the sensors 41, 42 and 43 may take any forms well known in the art, respectively. The vehicle speed sensor 42 may sense a rotational speed of each of the front wheels. The motor speed sensor 43 may sense directly a rotational speed of motor ω or may estimate a rotational speed of motor ω on the basis of an electric current applied to the electric motor 22.

Figure 8:
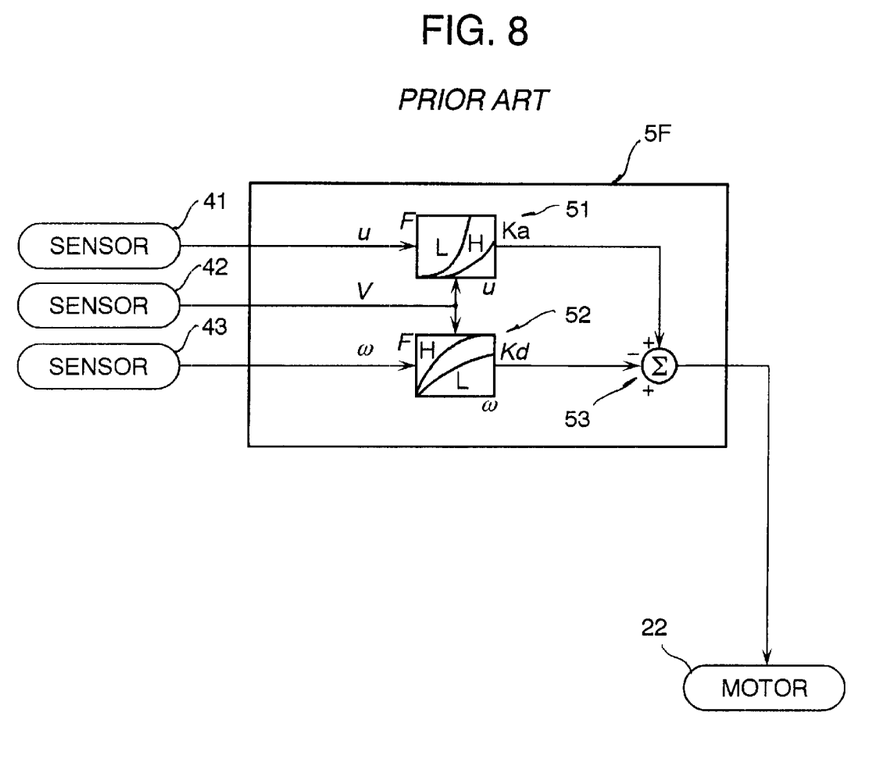
FIG. 8 is a block diagram showing a power steering control unit of a prior art electric power steering system.

Before describing the power steering control unit 5 of the present invention in detail, reference is made to FIG. 8 for the purpose of providing a brief background that will enhance an understanding of the operation of the power steering control unit.

FIG. 8 illustrates a power steering control unit 5F for a conventional electric power steering system. As shown in FIG. 8, the electric power steering control unit 5F receives signals representative of control parameters such as a signal of driver's turning torque 11 applied to the steering wheel from a torque sensor 41, a signal of vehicle speed V from a vehicle speed sensor 42, a signal of rotational speed of motor ω of an electric motor 22 from a motor speed sensor 43. Motor speed sensors are known in various forms and the vehicle speed sensor 42 and the motor speed sensor 43 may take any forms well known in the art, respectively. The vehicle speed sensor 42 may sense a rotational speed of each of the front wheels. The motor speed sensor 43 may sense directly a rotational speed of motor ω of the electric motor 22 or may estimate a rotational speed of motor ω on the basis of a current applied to the electric motor 22.

The power steering control unit 5F includes an assist control of block 51, a dumping control of block 52 and a motor control of block 53. In the assist control of block 51 a first motor control quantity is determined so that a signal disappears from the torque sensor 14. In the dumping control of block 52 a braking control quantity for the electric motor 22 is determined. In the motor control of block 43 a motor control quantity is determined on the basis of the first control quantity and the braking control quantity, specifically, on the basis of a result of an addition of one to another or a subtraction of one from another.

More specifically, the assist control of block (which is hereafter referred to as assist control means) 51 multiplies a steering wheel turning torque u senses by a assist control gain Ka to provide the first control quantity (Ka·u). The assist control gain Ka is variable depending on a vehicle speed V, a steering wheel turning torque u and a differential value of steering wheel turning torque u and takes a non-negative value (i.e. a positive value or zero). However, the assist control gain Ka is invariable with regard to vehicle speed V but is greater for lower vehicle speeds than for higher vehicle speeds. In this instance, steering control gain curves (L) and (H) are predetermined for lower vehicle speeds and higher vehicle speeds, respectively, so as meet a desired assist characteristic. The dumping control of block (which is hereafter referred to as dumping control means) 52 multiplies a dumping control gain Kd by a rotational speed of motor ω to provide a control quantity (Kd·ω). The dumping control gain Kd is variable depending on a vehicle speed V, a steering wheel turning torque u and a rotational speed of motor ω and takes a non-negative value. In this instance, dumping control gain curves (L) and (H) are predetermined for lower vehicle speeds and higher vehicle speeds, respectively, so as meet a desired dumping or convergence characteristic. Further, the motor drive control of block (which is hereafter referred to as motor drive control means) 53 subtracts the control quantity (Kd·ω) from the first control quantity (Ka·u) to provide a motor control quantity (Ka·u−Kd·ω). The power steering control unit 5F sends a control command signal representative of the motor control quantity (Ka·u−Kd·ω) to the electric motor 22 to control the electric motor 22 so as to provide the steering apparatus 100 with a desired assist torque. As a result, torque assist is provided to the vehicle steering according to the desired assist characteristics.

Figure 2:
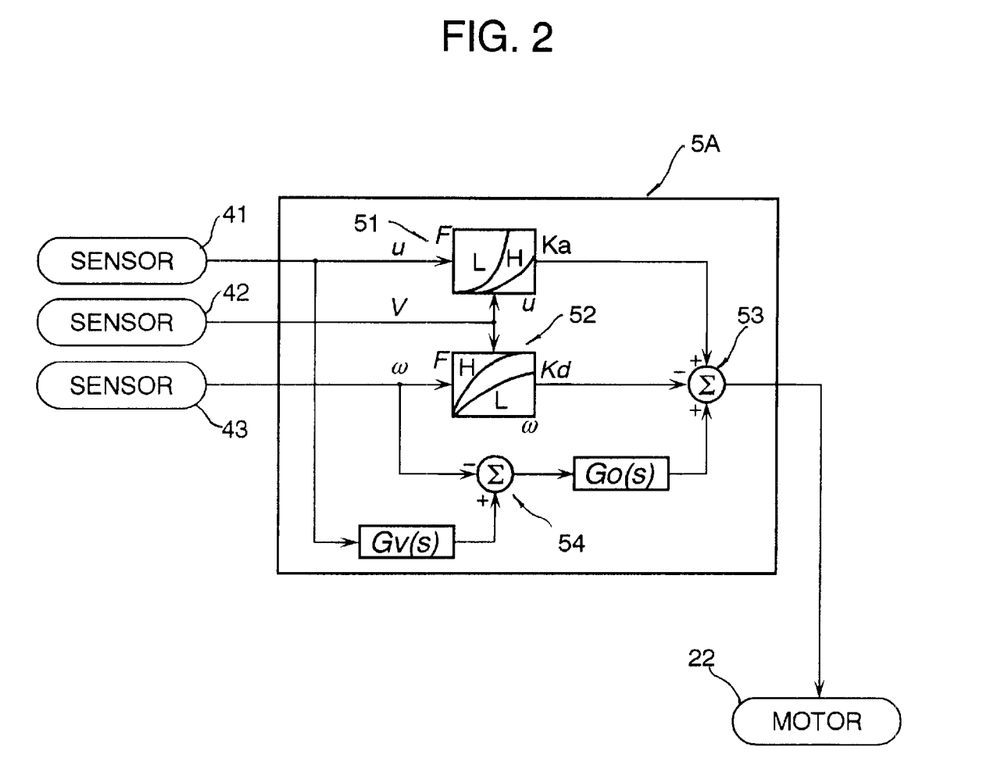
FIG. 2 is a block diagram showing a power steering control unit of the electric power steering system in accordance with a preferred embodiment of the present invention.

FIG. 2 shows a power steering control unit 5A in accordance with a preferred embodiment of the present invention. The power steering control unit 5F includes an assist control of block (which is hereafter referred to as assist control means) 51 as first control means, a dumping control of block (which is hereafter referred to as dumping control means) 52 and a motor drive control of block (which is hereafter referred to as motor drive control means) 53. The power steering control unit 5A receives signals representative of control parameters such as a signal of driver's turning torque u applied to the steering wheel from the torque sensor 41, a signal of vehicle speed V from the vehicle speed sensor 42 and a signal of rotational speed ω of the electric motor 22 from the motor speed sensor 43.

Although the power steering control unit 5A is basically similar in functional structure to the conventional power steering control unit 5F, the power steering control unit 5A is additionally provided with a wheel steering speed feedback control of block (which is hereafter referred to as wheel steering speed feedback control means) 54 as a second control means where a second control quantity is determined by subtracting an actual wheel steering speed from a target wheel steering speed. The term "wheel steering speed" as used in this specification shall means and refer to a rate of change in wheel steering angle of the front wheels of the vehicle.

In the power steering control unit 5A control quantities (Ka·u) and (Kd·ω) are determined in the assist control means 51 and the dumping control means 52, respectively, in the same manner as described in connection with the conventional power steering control unit 5F shown in FIG. 8.

Figure 3:
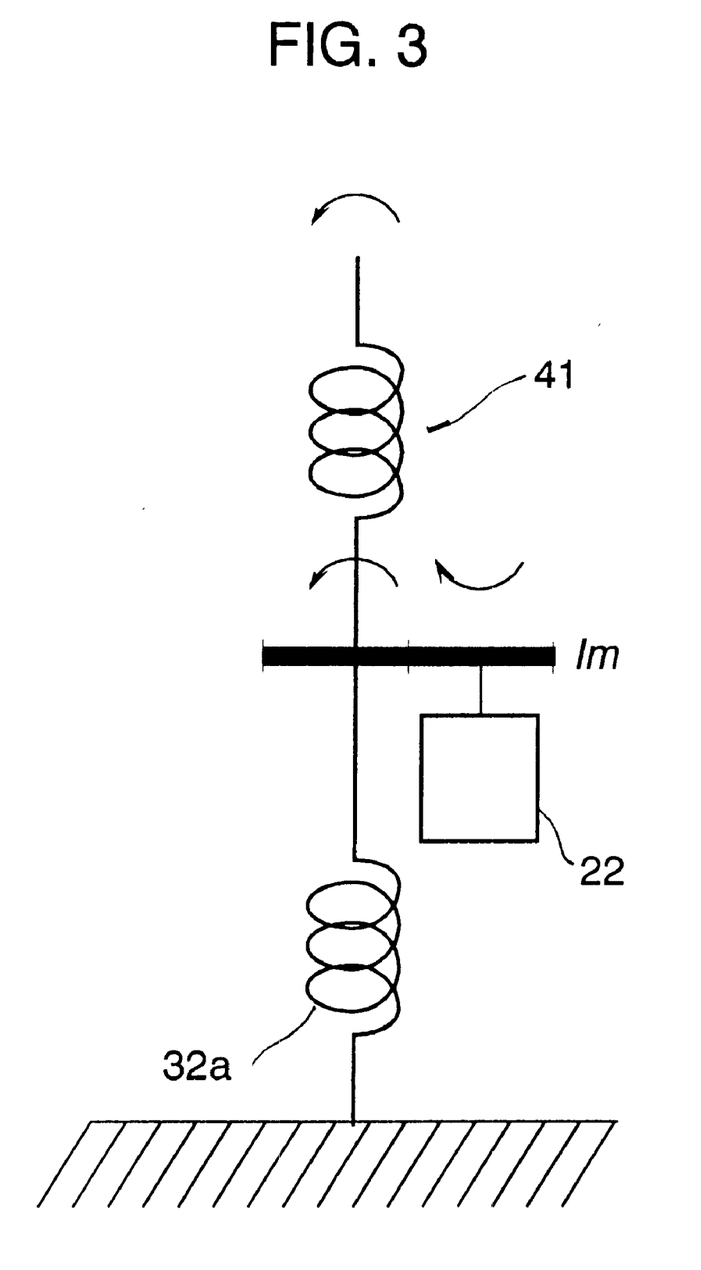
FIG. 3 is an illustration showing a vehicle model.

The wheel steering speed feedback control means 54 receives a signal representative of a steering wheel turning torque u, which is applied by the operator, from the torque sensor 41 and determines a target rotational speed of motor (Gv(s)·u) for the electric motor 22 by the use of a transfer function Gv(s) and the steering wheel turning torque u. In this instance, the transfer function Gv(s) is determined on the base of a vehicle model of a mechanical system of the steering apparatus 100 from the torque sensor 41 to a tire 32a on the front wheel 32. That is, as shown in FIG. 3, the modeling is made on the assumption that a coil spring 32a, which represents reaction force of a tire 32a on the front wheel 32, is secured. The transfer function Gv(s) is given by an expression (I) which is formulated taking spring component Kt and dumping component Ct of the tire 32a and inertia Im around pinion shaft of the electric motor and knuckle arm into consideration.

$$Gv(s)=(Ka+1)\cdot s/\{I_m\cdot s^2+(Ct+Kd)s+Kt\} \quad (I)$$

where s is Laplace operator.

The wheel steering speed feedback control means 54 further determines a deviation (Gv(s)·u−ω) of an actual rotational speed of motor ω of the electric motor 22 detected by the motor speed sensor 43 from the target rotational speed of motor (Gv(s)·u) and then determines a second control quantity by multiplying the deviation (Gv(s)·u−ω) by a control gain Go(s). In the motor control means 53 a motor control quantity is determined by subtracting the control quantity (Kd·ω) from a resultant value of the control quantities (Ka·u) and {(Gv(s)·u−ω) Go(s)} determined in the control mans 51 and 54, respectively, added together. The power steering control unit 5A sends a control command signal representative of the motor control quantity to the electric motor 22 and controls the electric motor 22 so that the electric motor 22 attains the target rotational speed of motor (Gv(s)·u).

Even in the case where a target rotational speed of motor (Gv(s)·u) is not attained due to friction or inertia when the electric motor 22 is controlled by the use of a control quantity (Ka·u) determined in the assist control means 51, the power steering control unit 5A controls the electric motor 22 so as to attain the target rotational speed of motor (Gv(s)·u). Therefore, there is provided thrust in the electric motor 22 that is short in order for the electric motor 22 to attain the target rotational speed of motor (Gv(s)·u). In this instance, because the rotational speed of motor ω is determined independently from variations in friction and/or inertia of structural components or parts of the steering apparatus 100, the electric motor 22 always attains the target rotational speed of motor (Gv(s)·u) irrespectively variations in friction and/or inertia among steering apparatuses, which always provides desired assist characteristics. When there is a torque acting on the steering wheel 11 that is detected by the torque sensor 41, in other words, when there occurs a response delay in a change in wheel steering angle of the front wheels 32 with respect to a turn of the steering wheel 11, the electric motor 22 is controlled by the second control quantity determined in the wheel steering speed feedback control means 54 so as to increase thrust. Therefore, the steering wheel 11 is prevented from providing a feeling of tottery operation and, in consequence, the follow-up property of wheels is improved. In this instance, the wheel steering angle can be found from an actual rotational speed of the electric motor 22 that is detected by the motor speed sensor 43. Further, the wheel steering speed can be found by differentiating the wheel steering angle. An angle sensor may be used to detect directly a wheel steering angle of the wheels.

Further, when the torque sensor 41 indicates a measured value of zero due, for example, to letting go a hold on the turned steering wheel 11, the wheel steering speed feedback control means 54 determines the second control quantity so as to bring a rotational speed of motor into zero. This prevents the steering wheel 11 from totteringly shaking and, in consequence, provides the steering wheel 11 with improved yaw overshoot cancellation property of wheels. Because the target rotational speed of motor (Gv(s)·u) is always set to zero, the yaw overshoot cancellation property of wheels always exhibits the intended characteristics irrespectively of magnitude of friction and/or inertia. As a result, there is no variations in the yaw overshoot cancellation property of wheels, and hence the steering wheel, among steering apparatuses. On the other hand, when the wheel steering angle changes due, for example, to irregularities of a road surface, the motor control is implemented so as to bring a rotational speed of the electric motor 22 to zero, which indicates that the steering apparatus tries to hold the steering wheel 11 in the center. This improves the straight ahead controllability of vehicle.

As described above, in the electric power steering system of the present invention, the electric motor 22 is controlled so as to attain a target rotational speed that is determined on the basis of the torque applied to the steering wheel 11 in the wheel steering speed feedback control means 54. If there occurs a change in steering angle of the front wheel 32 that is different from that of the modeled vehicle shown in FIG. 3, the control is implemented so as to cancel the difference of the change in steering angle. Therefore, the electric power steering system always exhibits the intended assist characteristics of steering apparatus and the yaw overshoot cancellation property of wheels The control is further implemented so that the electric motor 22 attains the target rotational speed of motor (Gv(s)·u), providing improvement in the follow-up property of wheels, the yaw overshoot cancellation property of wheels and the straight ahead controllability of vehicle. In addition, the power steering control unit 5A of the electric power steering system can be realized by merely additionally providing the conventional power steering control unit 5F with the wheel steering speed feedback control means 54, which is inexpensive Therefore, the steering apparatus 100 can be the same in structure as the conventional steering apparatus and has no necessity of being provided with an extra sensor. This is one of contributory causes of both the attainment of the given assist characteristics and the yaw overshoot cancellation property of wheels and the improvement in all of the follow-up property of wheels, the yaw overshoot cancellation property of wheels and the straight ahead controllability of vehicle, which can be realized with complex control beyond the scope of a low cost power steering control unit.

The electric power steering system can be more desirable by regulating the control gain Go(s), in other words, by changing the sensitivity of control quantity provided in the wheel steering speed feedback control means 54.

Specifically, the control of the target rotational speed of motor (Gv(s)·u) in the wheel steering speed feedback control means 54 is preferably regulated so as to basically enhance the straight ahead controllability of vehicle while the vehicle travels at a high speed.

For example, when replacing the control gain Go(s) with a constant Ko, it is preferred to vary the constant Ko in various manners like below.

(1) The constant Ko is changed larger with an increase in vehicle speed V.
   Low vehicle speeds V make the vehicle model disagree with the actual vehicle in addition to causing a less influence of friction on the steering apparatus.

(2) The constant Ko is changed larger with a decrease in road surface friction coefficient $\mu$.
   Low road surface friction coefficients $\mu$ make the vehicle model disagree with the actual vehicle due to a decrease in the reaction force of tire against twist. The detection of road surface friction coefficients $\mu$ can be made on the basis of wheel speed, or otherwise may be made in any conventional manner.

(3) The constant Ko is changed larger with an increase in gross vehicle weight.
   Because heavy vehicles make tires difficult to turn, the electric motor 22 is preferred to correspondingly increase thrust. The detection of vehicle weight can be made by a load sensor, or otherwise may be estimated on the basis of engine load.

(4) The constant Ko is changed larger with a decrease in wheel steering angle.
   This provides enhanced improvement in the yaw overshoot cancellation property of wheels and, in consequence, provides improvement in the straight ahead controllability of vehicle.

(5) The constant Ko is changed larger with a decrease in wheel steering speed.
   When the wheel steering speed is large, the inertia of the front wheels becomes larger. This causes steering of the front wheels to be often apt to get behind a turn of the steering wheel. Therefore, it is preferred to provide the electric motor 22 with high thrust.

Instead of changing the constant Ko according to wheel steering speed, a high pass filter can be used in substitution for the control gain Go(s) as given the following expression (II).

$$Gv(s) = Ka \cdot \omega n \cdot s / \{s + \omega n\} \quad (II)$$

where $s$ is Laplace operator.

Further, in this instance, the sensitivity of control quantity of (feedback sensitivity) provided in the wheel steering speed feedback control means 54 is increased. In the expression (II), $\omega n$ can be appropriately adjusted as a regulation parameter.

Figure 4:
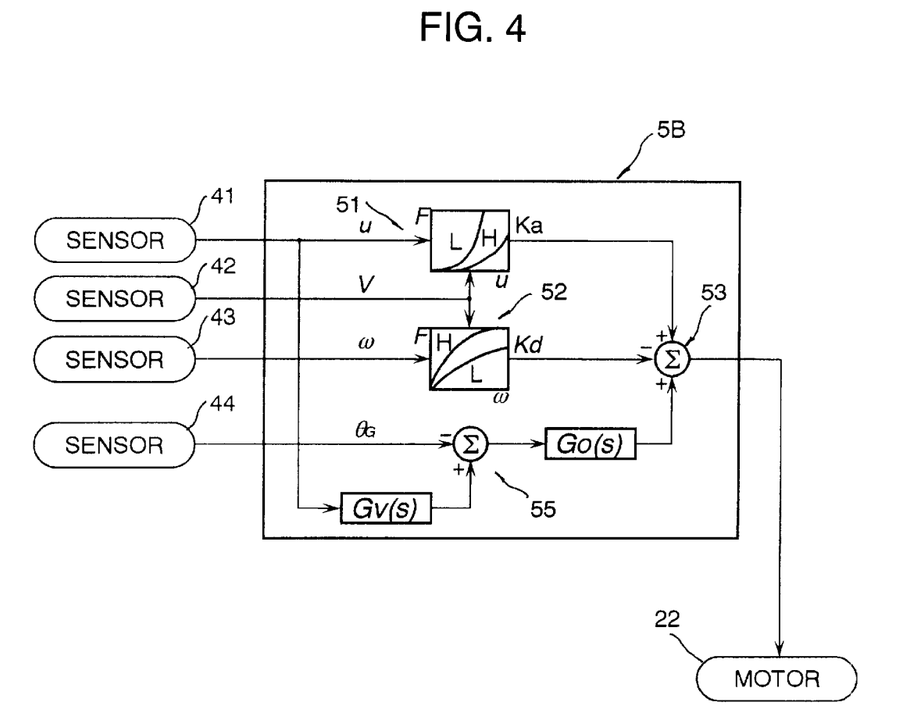
FIG. 4 is a block diagram showing a power steering control unit of the electric power steering system in accordance with another preferred embodiment of the present invention.

FIG. 4 shows a power steering control unit 5B in accordance with a preferred embodiment of the present invention.

Although the power steering control unit 5B is basically similar in functional structure to the power steering control unit 5A, the power steering control unit 5A has a wheel steering angle feedback control of block (which is hereafter referred to as wheel steering angle feedback control means) 55 as a second control means in place of the wheel steering speed feedback control means 54 of the power steering control unit 5A and is additionally provided with an angle sensor 44 operative to detect an rotational angle $\theta_G$ of the electric motor 22. The power steering control unit 5B additionally receives a signal representative of rotational angle $\theta_G$ of the electric motor 22 from the angle sensor 44. In the wheel steering angle feedback control means 55, a second control quantity is determined by subtracting an actual wheel steering angle from a target wheel steering angle that is determined on the basis of a measured value by the torque sensor 41. Although the actual rotational angle $\theta_G$ of the electric motor 22 is used to determine a target rotational angle of motor for the electric motor 22 in substitution for a target wheel steering angle, nevertheless, an actual wheel steering angle may be directly detected in order to determine a target wheel steering angle.

In operation of the power steering control unit 5B, the wheel steering angle feedback control means 55 receives a signal representative of a steering wheel turning torque u, which is applied by the operator, from the torque sensor 41 and determines a target rotational angle of motor (Gv(s)·u) for the electric motor 22 by the use of a transfer function Gv(s) and the steering wheel turning torque u. In this instance, the transfer function Gv(s) is determined on the base of the vehicle model shown in FIG. 3 and given by the following expression (III).

$$Gv(s) = (Ka+1)/\{I_m \cdot s^2 + (Ct+Kd)s + Kt\} \quad (III)$$

where $s$ is the Laplace operator.

The wheel steering angle feedback control means 55 further determines a deviation of an actual rotational angle $\theta_G$ of the electric motor 22 detected by the motor speed sensor 43 from a target rotational angle of motor (Gv(s)·u) and then determines a second control valve by multiplying the deviation (Gv(s)·u−$\theta_G$) by a control gain Go(s).

When necessary control quantities are determined in the control mans 51, 52 and 55, respectively, a motor control quantity is determined in the motor drive control means 53 by adding the first motor control quantity determined in the assist control means 51 and the second control quantity determined in the wheel steering angle feedback control means 55 together and then subtracting the braking control quantity determined in the dumping control means 52 from the resultant value. The power steering control unit 5B sends a control command signal representative of the motor control quantity to the electric motor 22 and controls the electric motor 22 so that the electric motor 22 rotates through the target rotational angle of motor. Because of the control of rotational angle of motor $\theta_G$ (i.e. wheel steering angle) causes the electric motor 22 to provide thrust that is short in order for the electric motor 22 to attain the target rotational angle of motor (Gv(s)·u) according to the second control quantity determined in the wheel steering angle feedback control means 55. In this instance, because the second control quantity is determined independently from variations in friction and/or inertia of structural components or parts of the steering apparatus 100 in the wheel steering angle feedback control means 55, the power steering control unit 5B always provides desired assist characteristics. This prevents steering apparatuses from having different assist characteristics. Because the electric motor 22 is controlled by the second control quantity determined in the wheel steering angle control means 55, when there is a response delay in steering of the front wheels 32 following a turn of the steering wheel 11, the electric motor 22 is controlled so as to increase thrust. Therefore, the electric motor 22 is driven immediately following up a turn of the steering wheel 11. This improves the follow-up property of wheels.

When there occurs a response delay in steering angle of the front wheels 32 with respect to a turn of the steering wheel 11, the electric motor 22 is controlled by the second control quantity determined in the wheel steering angle feedback control means 55 so as to increase thrust. Therefore, the electric motor 22 is driven immediately responding to a turn of the steering wheel 11. That is, the follow-up property of wheels is improved. Further, when the torque sensor 41 indicates a measured value of zero, the electric motor 22 is controlled so as to attain a rotational angle $\theta_G$ of zero. Therefore, when releasing a hold on the turned steering wheel 11, the wheel steering angle becomes zero, so as to quickly bring the steering wheel into the center or neutral position. Because the target rotational angle of motor is always set to zero irrespectively of magnitude of and/or inertia, the steering wheel always operates with a desired yaw overshoot cancellation property of wheels.

If there occurs a change in wheel steering angle due to disturbances, the control is implemented to bring the wheel steering angle into zero. This improves the straight ahead controllability of vehicle.

The power steering control unit 5B of the electric power steering system can be realized by merely additionally providing the conventional power steering control unit 5F with the angle sensor 44 operative to detect an rotational angle of motor $\theta_G$. This is one of contributory causes of the improvement in yaw overshoot cancellation property of wheels, the follow-up property of wheels, and the straight ahead controllability of vehicle, which can be realized with complex control beyond the scope of a low cost power steering control unit.

The electric power steering system can also be more desirable by regulating the control gain Go(s), in other words, by changing the sensitivity of control quantity provided in the wheel steering angle feedback control means 55 so as to perform the control such that the straight ahead controllability of vehicle is enhanced while the vehicle travels at a high speed. Specifically, when replacing the control gain Go(s) with a constant Ko, it is preferred to vary constant Ko in various manners like below.

(1) The constant Ko is preferably changed larger with an increase in vehicle speed V.
(2) The constant Ko is preferably changed smaller with a decrease in road surface friction coefficient $\mu$.
(3) The constant Ko is changed larger with an increase in gross vehicle weight.
(4) The constant Ko is changed larger with a decrease in wheel steering angle.
(5) The constant Ko is changed larger with a decrease in wheel steering speed.

Instead of changing the constant Ko according to wheel steering speed, a high pass filter may be used in substitution for the control gain Go(s) as given by the expression (II).

Figure 5:
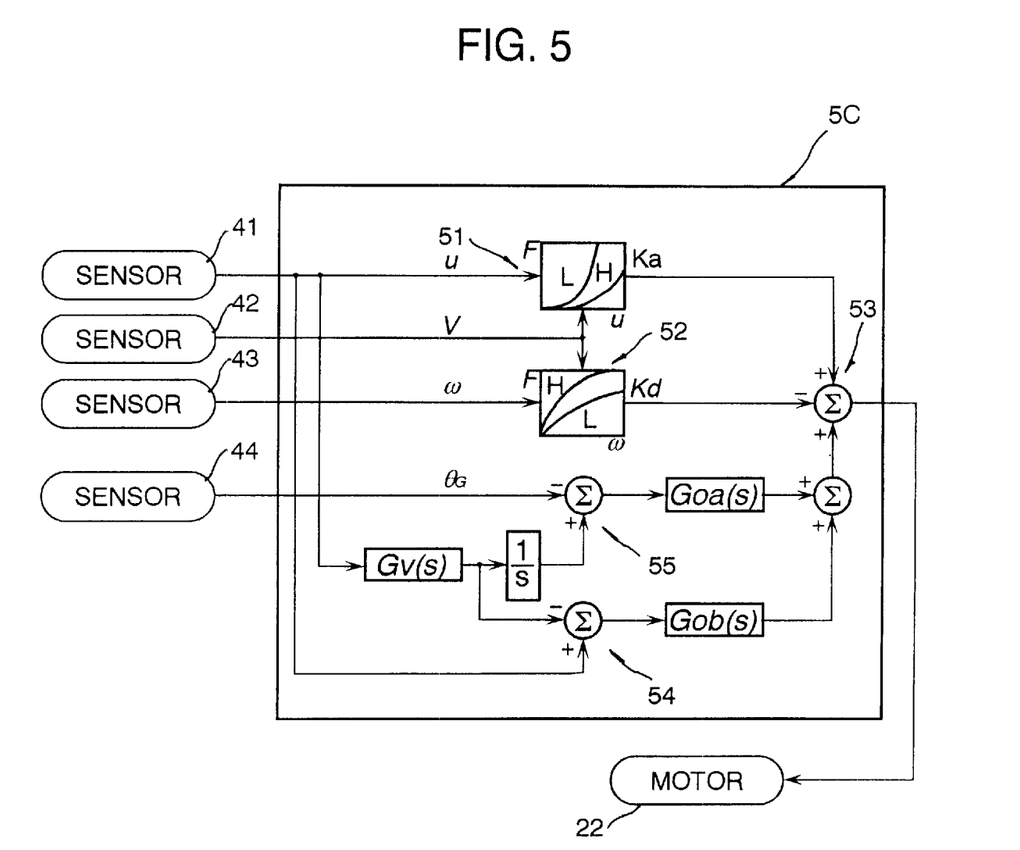
FIG. 5 is a block diagram showing a power steering control unit of the electric power steering system in accordance with another preferred embodiment of the present invention.

FIG. 5 shows a power steering control unit 5C in accordance with another preferred embodiment of the present invention. The power steering control unit 5C has a wheel steering speed feedback control means 54 and a wheel steering angle feedback control means 55 in addition to all components of the conventional power steering control unit 5A As was described above, the control by the power steering control unit 5A shown in FIG. 3 is such as to bring the wheel steering speed (a rate of change in steering angle of wheels or a rate of change in rotational angle of motor) to zero when there is no turning torque u acting on the steering wheel 11. The control by the power steering control unit 5B shown in FIG. 4 is such as to bring the wheel steering angle (rotational angle of motor) to zero when there is no turning torque u acting on the steering wheel 11. That is, the power steering control is implemented on the basis of steering displacement of the wheels by the power steering control unit 5A or on the basis of steering speed of the front wheels by the power steering control unit 5B. Therefore, the power steering control unit 5A possibly causes such an action as reducing a self-aligning torque on the front wheels differently from the power steering control unit 5B shown in FIG. 4. On the other hand, the power steering control unit 5B possibly causes response delay in steering of the front wheels following a turn of the steering wheel as compared with the power steering control unit 5A. The power steering control unit 5B further possibly makes steering heavier because the control is implemented so as to bring the wheel steering angle to zero even when a turning torque u acting on the steering wheel 11 disappears in a state where the vehicle remain steered.

In light of these possible problems, the power steering control unit 5C shown in FIG. 5 is adapted to perform the control on the basis of both wheel steering speed and wheel steering angle.

In the power steering control unit 5C, wheel steering speed feedback control means 54 determines a target rotational speed of motor (Gv(s)·u) (a target wheel steering speed) by the use of a transfer function Gv(s), that is given by the expression (I), and a steering wheel turning torque u, and then determines a deviation (Gv(s)·u−ω) of the target rotational speed of motor (Gv(s)·u) from an actual rotational speed of motor co of the electric motor 22. Finally, the wheel steering speed feedback control means 54 determines a second control quantity by multiplying the deviation (Gv(s)·u−ω) by a control gain Gob(s).

Wheel steering angle feedback control means 55 determines a target rotational angle of motor (Gv(s)s$^{-1}$·u) for the electric motor 22 by integrating the target rotational speed of motor (Gv(s)·u) that is determined by multiplying the steering wheel turning torque u by the transfer function Gv(s). The wheel steering angle feedback control means 55 determines a deviation (Gv(s)s$^{-1}$·u−$\theta_G$) of the target rotational angle of motor (Gv(s)s$^{-1}$·u) from an actual rotational angle of motor $\theta_G$.

In the power steering control unit 5C, the motor drive control means 53 determines a motor control quantity by subtracting a braking control quantity determined in the dumping control means 52 from an addition of the control quantities determined in the control mans 51, 54 and 55, respectively. The power steering control unit 5C sends a control command signal representative of the motor control quantity to the electric motor 22.

Because the power steering control unit 5C implements the feedback control of both rotational angle of motor and rotational speed of motor, the control always performs the desired assist characteristic and the yaw overshoot cancellation property of wheels irrespectively of variations of friction and inertia, In addition to improvement in the follow-up property of wheels, the yaw overshoot cancellation property of wheels, and hence of steering apparatus, and the straight ahead controllability of vehicle, the power steering control unit 5C complements aforementioned possible problems and provides the power steering apparatus a good responsiveness 100 with improved responsiveness.

It is desirable to regulate the control gains Goa(s) and Gob(s) so that the wheel steering speed feedback control means 54 and wheel steering angle feedback control means 55 perform the control such as to enhance the straight ahead controllability of vehicle basically while the vehicle travels at a high speed. Specifically, when replacing the control gains Goa(s) and Gob(s) with constants Koa and Kob, respectively, it is preferred to vary the constants Koa and Kob in various manners like below.

(1) The constants Koa and Kob are preferably changed larger with an increase in vehicle speed V.
(2) The constants Koa and Kob are preferably changed smaller with a decrease in road surface friction coefficient $\mu$.

(3) The constants Koa and Kob are changed larger with an increase in gross vehicle weight.
(4) The constants Koa and Kob are changed larger with a decrease in wheel steering angle.
(5) The constants Koa and Kob are changed larger with a decrease in wheel steering speed.

Instead of changing the constants Koa and Kob according to wheel steering speed, a high pass filter may be used in substitution for the control gain Goa(s) or Gob(s) as given by the expression (II).

Figure 6:
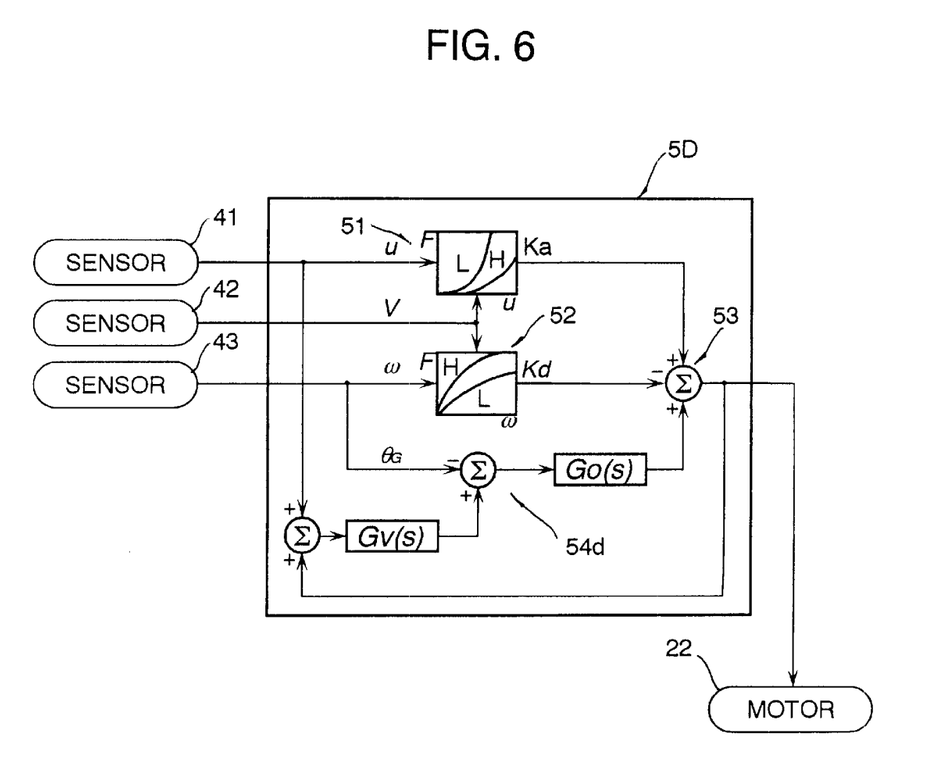
FIG. 6 is a block diagram showing a power steering control unit of the electric power steering system in accordance with still another preferred embodiment of the present invention.

FIG. 6 shows a power steering control unit 5D in accordance with still another preferred embodiment of the present invention. The power steering control unit 5D has a wheel steering speed feedback control means 54d similar to but different in structure from the wheel steering speed feedback control means 54 of the power steering control unit 5A shown in FIG. 2.

The wheel steering speed feedback control means 54 receives a signal representative of a steering wheel turning torque u, which is applied by the operator, from the torque sensor 41 and a signal representative of a motor control quantity from the motor control means 53 and determines a target rotational speed of motor (Gv(s)·u) for an electric motor 22 by the use of a transfer function Gv(s) and an added result of the steering wheel turning torque u and the motor control quantity. In this instance, the transfer function Gv(s), which is determined on the base of a vehicle model of part of the steering apparatus 100 between the torque sensor 41 and tire 32a on the front wheel 32, is given by the expression (IV) below.

$$Gv(s)=Kb \cdot s/\{I_m \cdot s^2+(Ct+Kd)s+Kt\} \quad (IV)$$

where Kb is the regulatory parameter which can be appropriately determined and s is Laplace operator.

As apparent in the expression (IV), the transfer function Gv(s) does not include the factor of assist control gain Ka.

The wheel steering speed feedback control means 54 determines a deviation (Gv(s)·u−ω) of the target rotational speed of motor (Gv(s)·u) from an actual rotational speed of motor ω of the electric motor 22 detected by the motor speed sensor 43 and then determines a second control quantity by multiplying the deviation (Gv(s)·u−ω) by a control gain Go(s). On the other hand, the motor control means 53 determines a motor control quantity is determined by subtracting a braking control quantity determined in the damping control means 52 from the added value of the control quantities determined in the assist control mans 51 and the wheel steering speed feedback control means 54, respectively. The power steering control unit 5D sends a control command signal representative of the motor control quantity to the electric motor 22 and controls the electric motor 22 so that the electric motor 22 attains the target rotational speed of motor (Gv(s)·u). In the power steering control unit 5D, the feedback control of rotational speed of motor ω is performed by the wheel steering speed feedback control means 54 like the power steering control unit 5A shown in FIG. 2, so that there is provided thrust in the electric motor 22 that is short in order for the electric motor 22 to attain the target rotational speed of motor (Gv(s)·u). Therefore, the steering apparatus 100 always shows a desired assist characteristic and a desired yaw overshoot cancellation property of wheels. In addition, the steering apparatus 100 is improved in the follow-up property of wheels.

The wheel steering speed feedback control means 54 determines a target rotational speed of motor (Gv(s)·u) on the basis of a motor control quantity for the electric motor 22, i.e. on the basis of control quantities determined in the assist control mans 51 and the damping control means 52, respectively. In this instance, it is not necessary to incorporate the assist control gain Ka into the transfer function Gv(s) (see Expression IV) since it is already taken into consideration in the control quantity determined in the assist control mans 51. In consequence, there is no necessity of using a differential value of turning torque u that is necessary to determine an assist control gain Ka. This makes structure and operation of the wheel steering speed feedback control means 54 simple. In addition, this allows the power steering control unit 5D to have a small capacity of memory because of the disuse of data of the assist control gain Ka and its associated values.

Dissimilarly from the control in which a parallel determination of control quantities is implemented in the assist control mans 51, according to the power steering control unit 5D, the target rotational speed of motor is determined in the wheel steering speed feedback control means 54 on the basis of control quantities determined in the assist control mans 51 and the damping control means 52, respectively. This enhances the correlation between the control quantity that is given by adding the control quantity determined in the assist control mans 51 and subtracting the control quantity determined in the damping control means 52 (i.e. the control quantity obtained by making a correction of the control quantity determined in the assist control mans 51 on the basis of the control quantity determined in the damping control means 52) and the control quantity determined in the wheel steering speed feedback control means 54. As a result, there is provided improvement in the follow-up property of wheels and the yaw overshoot cancellation property of wheels. This results in enhanced improvement in the feeling of steering. The electric power steering system can also be more desirable by regulating the control gain Go(s) in the same manners as described previously.

Figure 7:
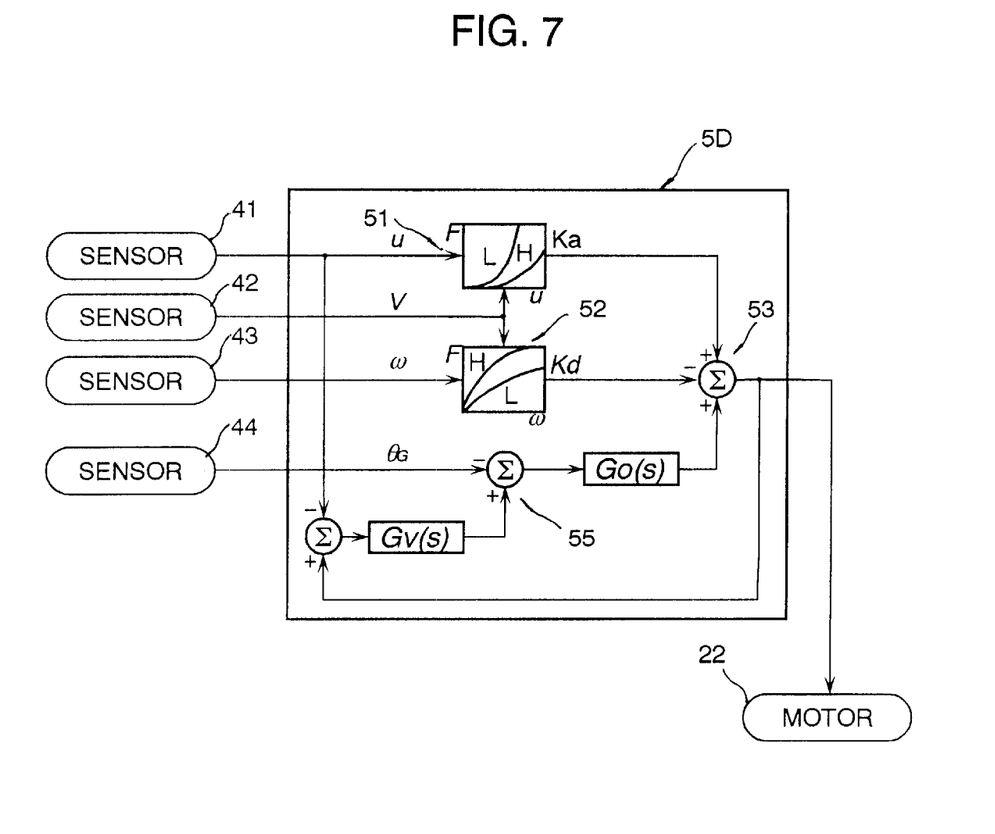
FIG. 7 is a block diagram showing a power steering control unit of the electric power steering system in accordance with a further preferred embodiment of the present invention.

FIG. 7 shows a power steering control unit 5E in accordance with a further preferred embodiment of the present invention. The power steering control unit 5E is similar in structure to the power steering control unit 5B shown in FIG. 4 and is however dissimilar in operation of a wheel steering angle feedback control means 55. The wheel steering angle feedback control means 55 determines a control quantity on a steering wheel turning torque u detected by a torque sensor 41 and a motor control quantity determined in the motor control means 53 like wheel steering angle feedback control means 55 of the power steering control unit 5D shown in FIG. 6.

In this embodiment, the transfer function Gv(s), which is determined on the base of a vehicle model of part of the steering apparatus 100 shown in FIG. 3, is given by the expression (V) below.

$$Gv(s)=Kb/\{I_m \cdot s^2+(Ct+Kd)s+Kt\} \quad (V)$$

Because the power steering control unit SE performs the feedback control of rotational angle of motor $\theta_G$ similarly to the power steering control unit 5B, the steering apparatus 100 always shows a desired assist characteristic and a desired yaw overshoot cancellation property of wheels. In addition, the steering apparatus 100 is improved in the follow-up property of wheels, and the front wheels quickly and smoothly return into a straight ahead traveling position. Because the wheel steering angle feedback control means 55 determines a target rotational angle of motor on the basis of a motor control quantity determined in the as motor drive control means 53 it is not necessary to incorporate the assist control gain Ka into the transfer function Gv(s). This makes structure and operation of the wheel steering angle feedback control means 55 simple. In addition, this allows the power steering control unit 5D to have a small capacity of memory because of the disuse of data of the assist control gain Ka and its associated values. Furthermore, because the target rotational angle of motor is determined in the wheel steering angle feedback control means 55 on the basis of control quantities determined in the assist control mans 51 and the damping control means 52, respectively, there is provided an enhancement of the correlation between the control quantity that is given by adding the control quantity determined in the assist control mans 51 and subtracting the control quantity determined in the damping control means 52 and the control quantity determined in the wheel steering angle feedback control means 55. As a result, there is provided improvement in the feeling of steering. The electric power steering system can also be more desirable by regulating the control gain Go(s) in the same manners as described previously.

In the electric power steering control system equipped with the power steering control unit 5A–5E, the electric motor 22 may be installed to the steering gearbox 21 so as to supply thrust to the rack in place of the pinion. In this instance, the vehicle model is changed correspondingly.

It is to be understood that although the present invention has been described in detail with regard to preferred embodiments thereof, various other embodiments and variants may occur to those skilled in the art, which are within the scope and spirit of the invention, and such embodiments and variants are intended to be covered by the following claims.

What is claimed is:

1. An electric power steering system for a vehicle which controls an electric motor so as to assist a turn of a steering wheel, said electric power steering system comprising:

a torque sensor disposed between the steering wheel and front wheels of the vehicle and operative to detect a turning torque applied to the steering wheel;

detection means for determining a wheel steering angle of the front wheels;

first control means for determining such a first control quantity as to countervail said turning torque when the electric motor is controlled with said first control quantity;

second control means for operating a target rate of change in wheel steering angle on the basis of said turning torque and for determining a second control quantity by subtracting an actual rate of change in wheel steering angle from said target rate of change in wheel steering angle; and motor control means for determining a motor control quantity by adding said first control quantity and said second control quantity together and for controlling the electric motor with said motor control quantity.

2. An electric power steering system as defined in claim 1, wherein said second control means changes a sensitivity of said second control quantity greater with an increase in vehicle speed.

3. An electric power steering system as defined in claim 1, wherein said second control means changes a sensitivity of said second control quantity smaller with a decrease in road surface friction coefficient.

4. An electric power steering system as defined in claim 1, wherein said second control means changes a sensitivity of said second control quantity greater with an increase in vehicle weight.

5. An electric power steering system as defined in claim 1, wherein said second control means changes a sensitivity of said second control quantity greater with a decrease in wheel steering angle.

6. An electric power steering system as defined in claim 1, wherein said second control means changes a sensitivity of said second control quantity greater with a decrease in rate of change in wheel steering angle.

7. An electric power steering system as defined in claim 1, wherein said second control means implements a high-pass filtering treatment of said second control quantity.

8. An electric power steering system for a vehicle which controls an electric motor so as to assist a turn of a steering wheel, said electric power steering system comprising:

a torque sensor disposed between the steering wheel and front wheels of the vehicle and operative to detect a turning torque applied to the steering wheel;

detection means for determining a wheel steering angle of the front wheels;

first control means for determining such a first control quantity as to countervail said turning torque when the electric motor is controlled with said first control quantity;

second control means for operating a target wheel steering angle on the basis of said turning torque and for determining a second control quantity by subtracting said actual wheel steering angle from said target wheel steering angle; and motor control means for determining a motor control quantity by adding said first control quantity and said second control quantity together and for controlling the electric motor with said motor control quantity.

9. An electric power steering system as defined in claim 8, wherein said second control means changes a sensitivity of said second control quantity greater with an increase in vehicle speed.

10. An electric power steering system as defined in claim 8, wherein said second control means changes a sensitivity of said second control quantity smaller with a decrease in road surface friction coefficient.

11. An electric power steering system as defined in claim 8, wherein said second control means changes a sensitivity of said second control quantity greater with an increase in vehicle weight.

12. An electric power steering system as defined in claim 8, wherein said second control means changes a sensitivity of said second control quantity greater with a decrease in wheel steering angle.

13. An electric power steering system as defined in claim 8, wherein said second control means changes a sensitivity of said second control quantity greater with a decrease in rate of change in wheel steering angle.

14. An electric power steering system as defined in claim 9, wherein said second control means implements a high-pass filtering treatment of said second control quantity.

15. An electric power steering system for a vehicle which controls an electric motor so as to assist a turn of a steering wheel, said electric power steering system comprising:

a torque sensor disposed between the steering wheel and front wheels of the vehicle and operative to detect a turning torque applied to the steering wheel;

detection means for determining a wheel steering angle of the front wheels;

first control means for determining such a first control quantity as to countervail said turning torque when the electric motor is controlled with said first control quantity;

second control means for operating a target wheel steering angle on the basis of said first control quantity and for determining a second control quantity by subtracting said actual wheel steering angle from said target wheel steering angle; and motor control means for determining a motor control quantity by adding said first control quantity and said second control quantity together and for controlling the electric motor with said motor control quantity.

16. An electric power steering system as defined in claim 15, wherein said first control means makes a correction of said first control quantity on the basis of a vehicle speed and a rate of change in wheel steering angle and said second control means makes a correction of said second control quantity on the basis of a vehicle speed.

* * * * *